INVENTOR
HUGH E. GARDENIER

United States Patent Office 3,613,333
Patented Oct. 19, 1971

1

3,613,333
PROCESS AND APPARATUS FOR CLEANING AND PUMPING CONTAMINATED INDUSTRIAL GASES
Hugh E. Gardenier, P.O. Box 206, 903 Forrest Drive, Tullahoma, Tenn. 37388
Filed July 17, 1969, Ser. No. 842,635
Int. Cl. B01d 47/10
U.S. Cl. 55—89
21 Claims

ABSTRACT OF THE DISCLOSURE

Process and apparatus for removing contaminants from and pumping a gas stream comprising indirectly heat exchanging the gas and a liquid, introducing the liquid under conditions of elevated temperature and pressure in vaporized and atomized form into the gas, mixing same thereby entrapping the contaminants, and separating clean gas from the atomized liquid containing the contaminants.

---

This invention relates to a process and apparatus for cleaning and pumping industrial gases.

Many industrial processes require the application of heat to basic materials so that the material can be melted and combined with other substances or purified and refined. Typical of this type of process is steel production and the refining of nonferrous metallic ores. A by-product of these processes is frequently high temperature contaminated gases. For many years, these industrial waste gases have been discharged in an uncontrolled manner into the atmosphere. Since this is a major identifiable source of air pollution, considerable pressure is being exerted to prevent this type of atmospheric pollution.

Currently there are two basic approaches to the problem of handling the hot contaminated industrial gases. The first process is generally referred to as the dry filter system. The basic elements of this system are ducting, fan, filter house, and conveyor system. The basic problem with equipment of this type is the temperature limitation of the filter elements. In most instances, the gas temperature must be cooled below approximately 500° F. before it is filtered. The cooling can be accomplished by drawing atmospheric air into the ducting and mixing it with the contaminated industrial gas. This additional air required for cooling increases the size of the fan and motor necessary to draw the gases through the ducting and into the filter house. The fans employed are generally placed directly in the ducting and thus are subject to corrosion by the hot gas stream resulting in high maintenance costs. Furthermore fans of this type generally require up to about 4000 horsepower for operation, thereby representing a major portion of the operating costs of the system. The system works satisfactorily; however, as mentioned above, the installation cost is high and the maintenance of the fan and filters is costly.

The second basic type of cleaning system is referred to as the wet scrubber process. The basic elements of this system are gas ducting, venturi, in-stream fans, water separator, and water filter system. With this type of equipment, the hot gases are removed from the process through the gas ducting and are passed through a venturi to increase the velocity thereof. At this point, water is injected into gas gas stream and the contaminants are captured in the water particles. The mixture is then passed through a fan into a water separator where the clean gases discharge to atmosphere and the contaminated water is discharged to a water cleaning system. Equipment of this type works satisfactorily; however, the installation cost is high and the operating and maintenance costs are also very high.

It is therefore an object of this invention to provide a process and apparatus for efficiently removing contaminants from industrial gases such that the gases can be discharged into the atmosphere without accompanying air pollution.

A further object of this invention is to accomplish the above object with equipment of low installation cost.

A still further object of this invention is to provide a process and apparatus which will substantially reduce operating costs.

A still further object of this invention is to utilize heat extracted from the industrial gases as the primary energy source thereby decreasing costs.

A still further object is to simultaneously pump and clean the contaminated gases thereby decreasing costs.

A still further object is to provide a process and apparatus utilizing raw materials which can be effectively recovered, treated and recycled through the system thereby reducing operating cost.

These and other objects will be apparent from the following specification and claims considered together with the accompanying drawings.

According to one aspect of this invention, a flowing hot gas containing contaminants is indirectly heat exchanged with a liquid thereby raising the temperature of the liquid, the liquid is then introduced into said hot gas downstream of the point of heat exchange under conditions of elevated temperature and pressure such that at least a portion of said liquid is converted to vapor and the remainder is atomized and accelerated by the expansion accompanying said vapor formation, and the hot gas is then mixed with said vaporized and atomized liquid thereby entrapping said contaminants in said atomized liquid.

According to another aspect of this invention, a region of reduced pressure relative to the pressure in the source of hot gas is increased by the liquid introduced into said hot gas thereby inducing the flow of said hot gas containing contaminants through ducting past said indirect heat exchange means, past the point of introduction, and into the mixing means thereby simultaneously pumping and cleaning said gas.

According to yet another aspect of this invention, after mixing said vaporized and atomized liquid with said hot gas, the thus formed mixture is passed to a separator from which said hot gas substantially free of contaminants is exhausted to the atmosphere or to further processing and the atomized liquid containing entrapped particles is discharged as a stream of liquid.

According to yet another aspect of this invention, the above discharged stream of liquid containing said contaminants is treated to remove the contaminants from at least a portion thereof and at least a portion of the thus cleaned liquid is recycled through said indirect heat exchange means.

According to yet another aspect of this invention, the mixture of vaporized and atomized liquid and hot gas is contacted with a coolant prior to passing to said separator to reduce the temperature thereof thereby condensing at least a part of the vaporized liquid.

According to yet another aspect of this invention, an apparatus is provided with which to carry out the above and further aspects comprising in part means for indirectly heat exchanging a gas flowing in ducting and a liquid, mixing means located downstream of said indirect heat exchange means with said mixing means for converting at least a part of the liquid to vapor and atomizing the remaining liquid and for introducing the atomized liquid into said mixing means, and means located downstream of said mixing means for separating said liquid from said hot gas.

These and other aspects of this invention will be more fully appreciated by referring to the accompanying drawings wherein.

Figure 1:
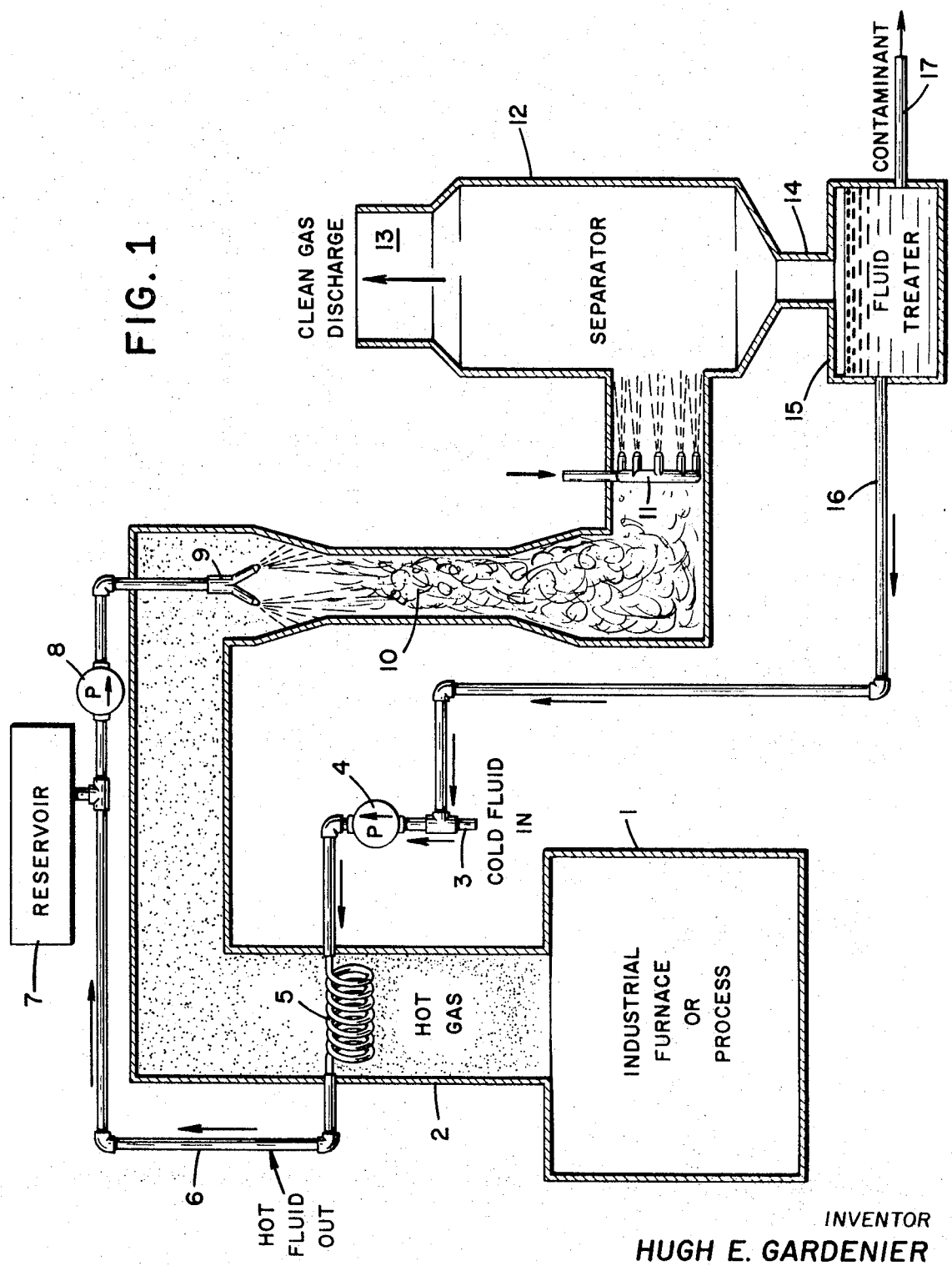
FIG. 1 is a schematic flow diagram of one aspect of the process of the invention.

Referring to FIG. 1, the industrial furnace or process 1 represents any furnace or process in which hot gas containing contaminants is produced either as a primary or secondary product. Exemplary are processes in which heat is applied to basic material which is melted and combined with other substances or purified and refined, such as process for steel production, for example, processes utilizing basic oxygen steel furnaces, blast furnaces, and electric arc steel furnaces of from about 25 to greater than 200 tons of steel capacity or foundary cupolas, or the refining and purification of nonferrous metallic ores, for example, titanium, or processes for the production of glass. The contaminants contained in the hot gases produced from the above processes are particulate materials, such as metallic particles and oxides, and also gaseous contaminants of many types.

Gas ducting 2 is provided so that the hot industrial gases may be drawn away from the furnace or processing vessel. Energy contained in these high temperature gases is transferred to a liquid heat transfer medium by means of indirect heat exchanger 5. The indirect heat exchanger can be of any commercially available configuration, the surface area of which is designed for the proper liquid temperatures at the design flow rates for each particular system as is well understood by those skilled in the art. A liquid pump 4 is provided to force the liquid through indirect heat exchanger 5 at least in part from a source indicated generally as 3. The heat exchange medium can be any liquid commonly used as such and is selected from a consideration of the particular process parameters present in the system together with the properties of the liquid such as heat capacity, vapor pressure, etc. as will be well understood by those skilled from a consideration of the above and the following detailed description of the invention. For example, the liquid can be water, Freon, etc.; however, because of its availability and desirable properties, the invention will hereinafter be described with reference to water as the heat exchange medium although the medium obviously need not be limited to such.

Energy contained in the high temperature gas, which, for example, can be from about 200 to 5000° F., is transferred to the water through the indirect heat exchanger. The heated water flows from the indirect heat exchanger through transfer means 6 and is stored for later use in the reservoir 7 or delivered by a water pump 8 directly to ejector nozzle 9, one embodiment of which is shown in greater detail in FIG. 3.

Because of the relative velocity between the water droplets issuing from the nozzle and the gas contaminants, the droplets will entrap the particles carried by the gas stream. Gaseous contaminants which are soluble in the water or liquid employed will also be removed from the gas stream by mass transfer therewith thus forming a solution with the water droplets. The velocity of the droplet is controlled by the area of the nozzle exit, the dimensions of the mixing chamber, the pressure of the water upstream of the nozzle, and the amount of fluid converted to vapor, and the temperature of the water. These variables can, of course, be varied within a wide range depending upon economic considerataions, such as size of the equipment and the nature and temperature of the hot gas. It has been found that the droplet velocity must be at least about 200 ft./sec. greater than the velocity of the gas stream. More preferably, the velocity of the droplets is at least about 700 ft./sec. greater than the velocity of the gas stream.

Because of the conditions of temperature and pressure of the water, the pressure being elevated by the combined action of pumps 4 and 8, at least a portion of the water is converted to steam as it issues from the nozzle. The expansion accompanying the formation of the steam or vapor accelerates and separates the remaining water into small droplets that are thereby propelled at high velocity. In general, it is necessary to adjust the temperature and pressure of the water in relationship to the apparatus employed such that from about 5 to about 20 weight percent of the water issuing from the nozzle is converted to vapor in order to obtain the proper droplet velocity. For most applications, it has been found adequate to convert about 15 percent of the water to vapor. Since in this relationship the temperature and pressure of the water are dependent variables, it is possible to select many sets of temperatures and pressures which will result in the required conversion of the water to vapor. In general, it has been found that water pressures of from about 50 to 700 p.s.i.a. and water temperatures of from about 220 to about 500° F. are adequate. Of course, temperatures and pressures outside of this range may be employed.

The temperature of the hot gas, of course, limits the temperature to which the water can be efficiently raised in indirect heat exchanger 5. For hot gases of from about 200 to about 5000° F., the above parameters are applicable. For hot gases in the lower temperatures of this range, higher pressures and/or smaller nozzle areas and/or smaller mixing chamber throat areas can be employed and vice versa. Furthermore, an absolute lower limit on the water temperature is generally set at 212° F. since for temperatures lower than this reduced pressure is required to partially vaporize the water therefore necessitating the use of vacuum producing equipment which would substantially increase the installation and operating costs of the instant invention. It is generally desirable to operate within the higher temperatures and pressures given above since smaller equipment can be used therewith.

In general, the volume of water employed is not a critical parameter and water flow rates within the range of from about 1 to about 3000 gal./min. are effective. It has been found, however, that the ratio of the weight of hot gas to the total weight of water employed must be controlled to some extent. For most systems, a ratio of the weight of gas to the weight of water must be within the range of from about 0.5 to about 2.5, more preferably from about 1.5 to about 2. This system operates effectively over a wide range of contaminant concentrations. Higher water flows, of course, are necessary for systems containing higher concentrations of contaminants.

The exact size and composition of the contaminant particles is not a critical parameter of the instant invention and it has been found that contaminant particles as small as 1 micron can be efficiently removed. According to the invention, greater than 90% of the contaminant particles can be removed; however, removal efficiencies as high as about 99.95% can be achieved although at some sacrifice of process economics.

From the above, it should be clear that each individual application of this process requires an engineering analysis to determine the proper water temperature, flow rate and pressure. The operating principle remains the same, however, regardless of the size and type of application.

Figure 2:
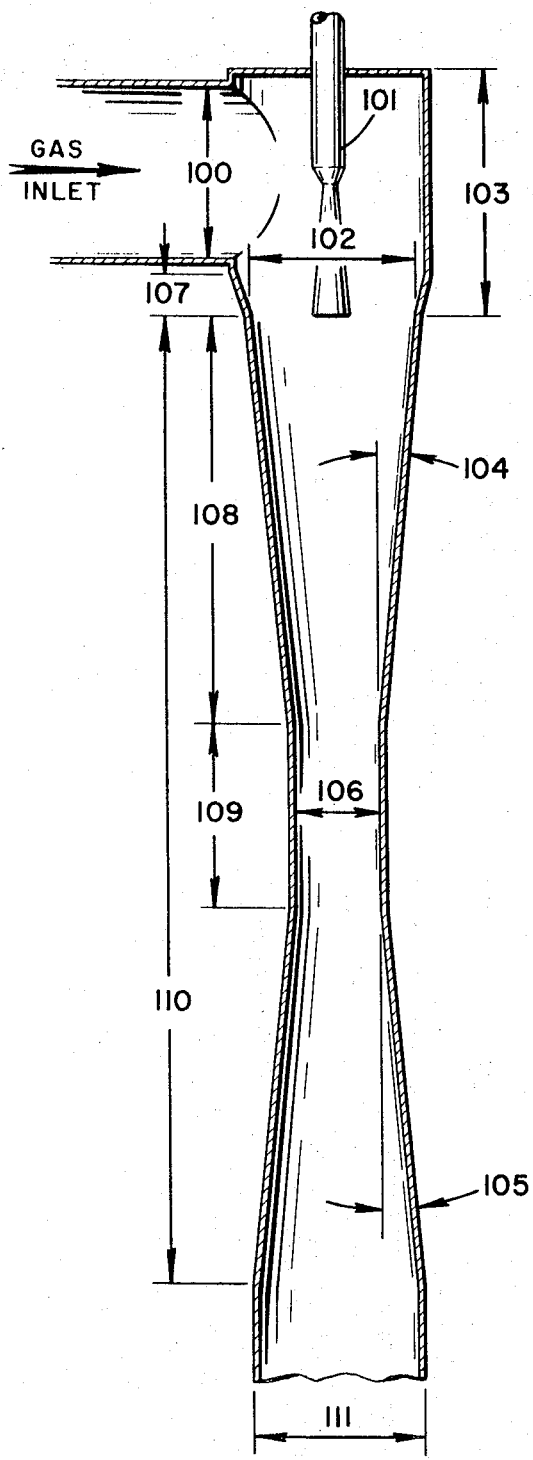
FIG. 2 is a schematic representation of one arrangement of nozzle and mixing chamber.
Figure 3:
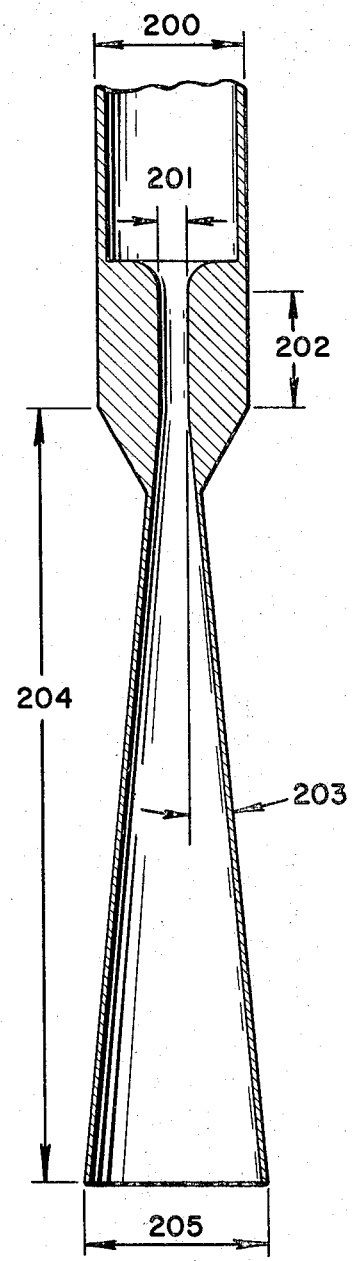
FIG. 3 is a schematic representation of the details of one particular nozzle.

The geometry of a typical nozzle and mixing chamber is shown in FIGS. 2 and 3, the dimensions of which are varied depending on the volume flow of gas required, type of contaminants in the gas, and the degree of cleaning necessary. It should also be noted that the ejector nozzle can be either a single nozzle similar to the one shown in the diagram, or a cluster of several nozzles as will be obvious to those skilled in the art. The water flow created by pump 8 (FIG. 1) passes through the ejector nozzle shown generally at 101. The hot gas containing contaminants passes through ducting 100 after passing over indirect heat exchanger 5 (FIG. 1). The water enters the nozzle through 200 into the throat area 202 through the expanding portion shown as 204 and the exit shown as 205. As described above, because of the temperature and pressure of the water and the apparatus dimensions, at least a portion of the water is converted to steam by exiting through the nozzle. In the venturi-shaped mixing chamber 10 shown generally in FIG. 1 and in more detail in FIG. 2, the mixture velocity produces pressure shock waves therein enhancing the mixing of the water droplets and the contaminated gas. In general, the requisite droplet velocity and mixing are attained in apparatus having the ratio of nozzle exit area to nozzle throat area of from about 1 to about 50 and the ratio of mixing chamber throat area 106 to nozzle throat area 201 of from about 50 to about 1000.

The dimensions of the apparatus are in general a function of the temperature of the flowing gas stream. As previously stated, the quantity of water converted to vapor determines in part the velocity of the droplets. The velocity of the droplets due to this phenomenon is thus a function of the available thermal energy in the flowing gas stream. For higher temperatures, the water may be heat exchanged to a higher temperature, thereby causing greater conversion to vapor, all other parameters being held constant. Thus, for systems of lower thermal energy, the above area ratios are placed in the lower ranges in order to create a smaller geometry thus achieving higher velocities and vice versa.

The expansion accompanying the formation of vapor as the fluid exits from the nozzle, the venturi effect in the mixing chamber, and the pressure shock waves created therein create a region of reduced pressure in the vicinity of the nozzle relative to the pressure in the industrial furnace or process such that a pressure differential is imposed on the system causing the gas to be sucked from the furnace or process. Thus the system is further designed to impose the pressure differential required to remove the quantity of gas produced by the furnace or process within a broad general range, the control of the flow rate being more finely adjusted by the velocity of the liquid issuing from the nozzle.

Referring back to FIG. 1, the mixture of atomized liquid, vaporized liquid, and hot gas exiting from the mixing chamber can be optionally further contacted with a coolant. The coolant may be the same or different as the liquid used as the heat exchange medium. For most applications, it is of course preferred to use the same liquid for both purposes. The contacting of the coolant with the mixture is accomplished by spraying said coolant into the ducting containing the gas for instance, through a cluster of nozzles such as shown by 11. Any configuration of nozzles commonly used for similar purposes in the industry is acceptable. In systems employing recycle of the heat exchange medium in order to conserve operating costs, it is necessary to reduce the temperature of the mixture thereby condensing at least a portion of the vaporized liquid thereby reducing the loss of said liquid. In general, where water is employed as the heat exchange medium it is necessary to reduce the temperature of the mixture to from about 150 to about 200° F., more preferably to about 175° F. In this way it has been found that only about 10% of the water employed remains as vapor and is thus lost to the system.

The mixture is then passed to a commercially available water separator 12 wherein the water droplets containing the contaminants are separated from the gas stream which then may be discharged to the atmosphere through 13 or to a further processing. For example, the water separator can be similar to the cycle separators manufactured by the R. P. Adams Company, The Burgess Company, the Centrifix Corporation, or the Raleigh-Austin Company.

The dirty water is removed from the separator through 14 and can be either discharged or passed to further treatment described below depending upon the economics of the process. The dirty water can be passed to a liquid treater shown at 15 wherein the contaminants can be removed from at least a portion of the water. The clean water is removed through transfer means 15, at least a portion of which is then recycled through pump 4 through the system, makeup water being added from the source 3 as may be required. The liquid treating apparatus can be any commercially available equipment comprising, for example, a system of filters and settling basins, etc.

Other aspects of this invention will be apparent from a consideration of the following specific example which is not intended to be limiting in any manner.

EXAMPLE

In the production of steel employing an electric-arc furnace of 200 ton steel capacity, gas is discharged at about 3000° F. at a flow rate of about 130,000 cubic feet per minute. The contaminants contained in said gas include ferric oxide, dolomite, zinc, copper and other trace metallic elements. Water is employed as the heat exchange medium and the water pressure at the nozzle is 400 p.s.i.a., the temperature is 358° F., and the flow rate is 440 gal./min. Referring to FIG. 1, the gas ducting 2 is 6 feet in diameter and the heat exchanger 5 is a simple tube-type with nominal 1-inch diameter tubes. Referring to FIGS. 2 and 3, the dimensions of the mixing chamber and the nozzle are given in the following table.

TABLE

| Reference numeral from FIGS. 2 and 3: | Dimension |
|---|---|
| 100 | 6' |
| 103 | 8'6" |
| 104 | 3° |
| 105 | 5° |
| 106 | 3' |
| 107 | 1'6" |
| 108 | 28'6" |
| 109 | 6' |
| 110 | 51'9" |
| 111 | 6' |
| 200 | 5" |
| 201 | 1" |
| 202 | 4" |
| 203 | 5° |
| 204 | 2'2.4" |
| 205 | 5.5" | wherein ' is feet, " is inches, and ° is degrees.

The mixture issuing from the mixing chamber is contacted with additional water spray to lower the temperature to 175° F. thereby partially condensing the remaining water vapor. The mixture then flows through separator 12 wherein the clean gas is discharged through 13 and the dirty water is discharged through transfer means 14 to water treater 15. The contaminants are removed through 17 and at least a portion of the clean treated water is recycled through 16. The clean gas is thus discharged to the atmosphere.

As mentioned above, the water is discharged through the nozzle from a pressure of 400 p.s.i.a. into the mixing chamber such that the velocity of the water droplets formed thereby is 815 ft./sec. thereby creating a region of reduced pressure in the vicinity of said nozzle of 13 p.s.i.a. relative to the pressure existing in the electric-arc furnace of about 14.7 p.s.i.a. This induced pressure differential of 1.7 p.s.ia. causes the gas to flow from said furnace at the above rate of 130,000 cubic ft./min. which is thus equal to a gas velocity in the vicinity of said nozzle of 150 ft./sec. The water droplets thus travel at a velocity of 665 ft./sec. greater than the velocity of the gas contaminants thereby entrapping the contaminants carried by the gas stream such that the gas discharged to the atmosphere contains less than about 10% of the contaminants contained therein before treatment.

What is claimed is:

1. An apparatus for drawing hot gases from a source and for removing contaminant particles therefrom, the apparatus comprising in combination:

ducting connected to said source for delivering said hot gases to a discharge region;

a source of a cleansing medium in its liquid state;

heat exchange means for directing said liquid cleansing medium through said ducting and for indirectly heat exchanging said hot gases in said ducting with the liquid cleansing medium;

low pressure ducting means for mixing the gases and the cleansing medium, located downstream of said heat exchange means intermediate said source and said discharge region and forming a continuous path therewith;

delivery means for conveying the heated cleansing medium from said heat exchange means to the region of said low pressure ducting means;

nozzle means integral with said delivery means at the end thereof in the region of said low pressure ducting means, for converting a portion of the heated liquid cleansing medium into vapor and a portion of the heated liquid cleansing medium into atomized droplets, and for injecting the atomized droplets into the region of said low pressure ducting means at a high velocity, said nozzle means comprising an area of reduced pressure wherein, through temperature and pressure considerations, the heated liquid cleansing medium is converted into vapor and atomized droplets;

said low pressure ducting means and said nozzle means cooperating and being dimensioned in such a manner that the velocity of said atomized droplets exiting said nozzle means is at least 200 feet per second greater than the velocity of the hot gases, and in such a manner that a reduced pressure is developed in said low pressure ducting means of such a magnitude as to draw the hot gases from said source toward said low pressure ducting means without the provision of a fan;

pump means for driving the cleansing medium from said source to said nozzle means;

separator means located downstream of said low pressure ducting means for separating the atomized droplets containing the contaminant particles from the hot gases;

discharge means in said discharge region for releasing cleansed hot gases to the atmosphere; and means for removing the cleansing medium, with the entrapped contaminant particles, from said separator means.

2. The apparatus of claim 1, wherein said low pressure ducting means is in the form of an elongated duct with a restriction in the region of said nozzle means in the direction of the flow of hot gases.

3. The apparatus of claim 2, wherein the ratio of the throat area of the restriction to the throat area of the nozzle is such that the velocity of said atomized droplets exiting said nozzle means is at least 700 feet per second greater than the velocity of the hot gases.

4. The apparatus of claim 2, wherein the ratio of the throat area of the restriction to the throat area of the nozzle is in the range of 50 to 1000.

5. The apparatus of claim 2, wherein said low pressure ducting means is in the form of a venturi.

6. The apparatus of claim 1, wherein said low pressure ducting means and said nozzle means cooperate and are dimensioned in such a manner that the velocity of the atomized droplets relative to the velocity of the hot gases is supersonic.

7. The apparatus of claim 1, wherein said heat exchange means is in the form of a tubular liquid-conducting coil and is positioned in said ducting adjacent said source.

8. The apparatus of claim 1, and further comprising means for introducing a coolant into the ducting intermediate said low pressure ducting means and said separator means.

9. The apparatus of claim 1, and further comprising means for separating the entrapped contaminant particles from at least a portion of the liquid removed from the separator means, thereby producing a stream of substantially contaminant-free liquid.

10. The apparatus of claim 9, and further comprising means for introducing at least a portion of said substantially contaminant-free liquid into said source of cleansing medium.

11. The apparatus of claim 1, and further comprising reservoir means connected to said delivery means for storing at least a portion of the heated cleansing medium.

12. The apparatus of claim 1, wherein said cleansing medium is water; wherein the temperature of the heated water is between 220° F. and 550° F.; wherein the area of reduced pressure in said nozzle means is such as to develop a pressure between 50 p.s.i.a. and 700 p.s.i.a.; wherein said atomized droplets injected into the region of said low pressure ducting means are injected at a flow rate of between 1 g.p.m. and 3000 g.p.m.; and wherein the temperature of said hot gases is between 200° F. and 3000° F.

13. The apparatus of claim 1, wherein the weight flow rate of the hot gases to the cleansing medium is between 0.5 and 2.5.

14. The apparatus of claim 1, wherein the portion of the heated liquid cleansing medium converted into vapor is from 5 weight percent to 20 weight percent of said liquid cleansing medium.

15. A method for drawing contaminated gases from a source through ducting and for removing contaminant particles therefrom, the method comprising the steps of:

heating a liquid cleansing medium;

introducing the heated cleansing medium to nozzle means under conditions of temperature and pressure such that a portion of the heated liquid cleansing medium is converted into vapor, a portion of the heated liquid cleansing medium is converted into atomized droplets, and the atomized droplets are accelerated by the expansion accompanying the vapor formation at an exit velocity at least 200 feet per second greater than the velocity of the contaminated gases;

mixing the accelerated atomized droplets with the contaminated gases in a mixing chamber located downstream of the nozzle means, thereby entrapping the contaminant particles in the accelerated atomized droplets and thereby developing a region of reduced pressure of such a magnitude as to draw the contaminated gases from the source toward the mixing chamber without the provision of a fan;

separating the atomized droplets containing the contaminant particles from the contaminated gases thereby producing a stream of substantially contaminant-free gas; and discharging the substantially contaminant-free gas to the atmosphere.

16. The method of claim 15, wherein contaminated gases are hot and wherein the liquid cleansing medium is heated by directing same through said ducting and thereby indirectly heat exchanging same with said hot gases.

17. The method of claim 15, and further comprising the step of contacting the contaminated gases and atomized droplets containing contaminant particles, subsequent to mixing in the mixing chamber, with a coolant fluid at a lower temperature than the mixture.

18. The method of claim 15, wherein the cleansing medium is water; wherein the temperature is between 200° F. and 550° F.; wherein the pressure is between 50 p.s.i.a. and 700 p.s.i.a.; wherein the flow rate of the water from the nozzle means is between 1 g.p.m. and 3000 g.p.m.; and wherein the temperature of the contaminated gases at the source is between 200° F. and 3500° F.

19. The method of claim 15, wherein the velocity of the atomized droplets emergent from the nozzle means is at least 700 feet per second greater than the velocity of the contaminated gases.

20. The method of claim 15, wherein the weight ratio of the flow rate of the contaminated gases to the cleansing medium is between 0.5 and 2.5.

21. The method of claim 1, wherein between 5 to 20 wt. percent of the cleansing medium is converted into vapor.

References Cited

UNITED STATES PATENTS

| | | | |
|---|---|---|---|
| 2,252,738 | 8/1941 | Stoever | 55—85 X |
| 3,212,235 | 10/1965 | Markant | 55—94 X |
| 3,487,620 | 1/1970 | Klein et al. | 55—222 |
| 3,490,204 | 1/1970 | Kalika | 55—94 |
| 2,935,375 | 5/1960 | Boucher | 55—257 |
| 3,385,030 | 5/1968 | Letvin | 55—257 |
| 3,420,450 | 1/1969 | Bergholm | 55—87 |

REUBEN FRIEDMAN, Primary Examiner

C. N. HART, Assistant Examiner

U.S. Cl. X.R.

55—94, 223, 228

UNITED STATES PATENT OFFICE
CERTIFICATE OF CORRECTION

Patent No. 3,613,333              Dated   October 19, 1971

Inventor(s)   Hugh E. Gardenier

It is certified that error appears in the above-identified patent and that said Letters Patent are hereby corrected as shown below:

Column 1, line 58, "fans" should read --fan--;

line 63, "gas" (first occurrence) should read --the--;

Column 2, line 34, "increased" should read --created--;

line 63, --, means interconnecting said indirect heat exchange means-- should be inserted after "means" (first occurrence);

Column 9, line 4, "claim 1" should read --claim 15--.

Signed and sealed this 4th day of April 1972.

(SEAL)
Attest:

EDWARD M. FLETCHER, JR.            ROBERT GOTTSCHALK
Attesting Officer                  Commissioner of Patents